United States Patent [19]

Moran

[11] Patent Number: 4,562,506
[45] Date of Patent: Dec. 31, 1985

[54] DISTRIBUTION LINE POWERED SWITCHGEAR CONTROL

[75] Inventor: Richard J. Moran, Milwaukee, Wis.

[73] Assignee: Cooper Industries, Inc., Houston, Tex.

[21] Appl. No.: 580,029

[22] Filed: Feb. 14, 1984

[51] Int. Cl.⁴ .................. H02H 7/22; H02H 3/07
[52] U.S. Cl. ................................. 361/71; 361/72; 361/94; 361/155; 361/156
[58] Field of Search .......... 361/71, 94, 95, 96, 361/97, 98, 115, 89, 156, 93, 154, 155

[56] References Cited

U.S. PATENT DOCUMENTS

| | | | |
|---|---|---|---|
| 3,100,854 | 8/1963 | Riebs . | |
| 3,116,439 | 12/1963 | Riebs . | |
| 3,167,686 | 1/1965 | Riebs . | |
| 3,295,017 | 12/1966 | Riebs et al. . | |
| 3,309,571 | 3/1967 | Gilker . | |
| 3,319,125 | 5/1967 | Gilker . | |
| 3,328,638 | 6/1967 | Reis . | |
| 3,351,814 | 11/1967 | Riebs . | |
| 3,373,317 | 3/1968 | Gilker . | |
| 3,381,176 | 4/1968 | Riebs et al. . | |
| 3,405,318 | 10/1968 | Gilker . | |
| 3,412,289 | 11/1968 | Gilker . | |
| 3,662,220 | 5/1972 | Riebs . | |
| 4,027,203 | 5/1977 | Moran et al. | 361/98 |
| 4,131,929 | 12/1978 | Moran | 361/93 |
| 4,153,924 | 5/1979 | Moran | 361/94 |
| 4,161,761 | 7/1979 | Moran | 361/94 |
| 4,223,365 | 9/1980 | Moran | 361/71 |
| 4,293,834 | 10/1981 | Date et al. . | |
| 4,352,138 | 9/1982 | Gilker | 361/92 |
| 4,386,384 | 5/1983 | Moran | 361/94 |
| 4,393,431 | 7/1983 | Gilker | 361/97 |

Primary Examiner—Patrick R. Salce
Attorney, Agent, or Firm—Eddie E. Scott; Hugh M. Gilroy

[57] ABSTRACT

A distribution line powered switchgear control is provided which reliably initiates switchgear operations with stored energy. Stored energy is preferably maintained in a plurality of devices including a power capacitor. The power capacitor is preferably charged by a fast arming circuit which preferably selects among a plurality of independent power sources. The switchgear control additionally isolates sources of stored energy so that depletion of one does not affect the others. Further the switchgear control will preferably prevent closing of the switchgear unless sufficient energy is stored to allow the control to initiate a subsequent opening of the switchgear.

11 Claims, 3 Drawing Figures

DISTRIBUTION LINE POWERED SWITCHGEAR CONTROL

BACKGROUND OF THE INVENTION

This invention relates to distribution line powered switchgear controls. More particularly this invention relates to circuits which rapidly charge a power capacitor in such controls to enable them to function reliably.

A network of power distribution lines must respond to normal variations of load requirements and abnormal fault conditions to maintain service to the greatest number of customers in an economical manner. To that end a variety of switchgear is used to vary the interconnections among the distribution lines. By necessity much of the switchgear is located far from power distribution centers and must have standalone capability. The types of switchgear employed include remotely actuated switches, sectionalizers and reclosers.

Remotely actuated switches are controlled by a power distribution center and may include indicating means which signal their state or the existence of a fault on a distribution line.

Sectionalizers are similar to remotely actuated switches but lack their ability to interrupt fault current. They are actuated after a fault interrupting device has acted to interrupt their source.

Reclosers sense faults on a distribution line and open to interrupt a fault a limited number of times within a short time interval. Most faults result from a temporary condition such as a branch brushing against a line. Once a fault resulting from a temporary condition is interrupted, the fault is often cleared until an initiating condition reoccurs. Faults resulting from a more permanent conditions such as a downed line are prevented from reoccurring by locking out or opening the contacts of a recloser until the cause of the fault is eliminated.

Switchgear should be located and coordinated in such a manner as to minimize an area of power outage due to a fault condition.

Most switchgear requires considerable power for reliable operation and it is difficult to supply remotely located switchgear and switchgear controls with power sources which are both reliable, under normal and abnormal conditions, and inexpensive. Much switchgear is operated by springs which are tensioned to store energy under normal distribution line conditions. An example of spring operated switchgear is disclosed in U.S. Pat. No. 4,293,834 to Date et al. Switchgear controls likewise have some energy storage means to enable them to operate when their associated distribution line is disconnected.

Switchgear controls in a quiescent state, when they are not initiating a opening or closing of the distribution line switches, have relatively low power requirements. Typically tens of milliamperes will suffice to keep the control reliably functioning in a quiescent state. However when the switchgear control enters an active state to initiate opening or closing the distribution line switches, the power required rises dramatically. Typically the control requirements will rise an order of magnitude or more and, amperes may be required in the active state. These increased power requirements must be furnished by the energy storage means which must either be maintained at a high level of storage or be very rapidly replenished.

The switchgear mechanisms which positions the distribution line switches take a relatively long time to completely respond to a switchgear control signal. Those mechanisms which are oil filled take about a half second to completely respond. If the energy storage means can be maintained at or restored to supply operating power within a half second, the switchgear control could initiate a close operation and then open immediately on the closing of distribution line switch. Restoring the switchgear control energy storage means within a half second would be considered adequate even when the control is associated with mechanisms which respond much faster than a half second.

Controls for switchgear, which initiate movement of the mechanism, are often battery operated with the battery being charged under normal operating conditions. An example of battery operated switchgear is disclosed in U.S. Pat. No. 3,116,439 to Riebs.

Some switchgear controls are operated from power capacitors which are charged by the distribution line under either normal or faulted conditions. An example of a power capacitor operated switchgear control is disclosed in U.S. Pat. No. 4,027,203 to Moran et al which obtains its power from distribution line currents. Another example of power capacitor switchgear control is disclosed in U.S. Pat. No. 4,352,138 to Gilker which obtains its power from the voltage on the source side of the line.

Each energy storage means to provide switchgear control operating power has advantages and disadvantages. Battery operated switchgear controls are expensive and may become inoperative due to battery or battery charging circuit failures particularly when fault occurrences extend over a long period. A number of approaches to minimize failures exist. One approach disclosed in U.S. Pat. No. 3,381,176 to Riebs et al. disconnects a battery after a successful closing operation or after a predetermined time after the switch opens.

Capacitor powered switchgear controls avoid the expense of a battery but, usually will not maintain a state of charge as long as a battery and become uneconomical if the energy stored approaches that typically found in batteries. Often a single operation will severely deplete the amount of energy stored in a power capacitor of moderate size and cost. Depending on the size of the power capacitor and and loading in the active state, the voltage of the power capacitor and the control bus may fall on the order of five or more volts. If current transformers alone were used to restore operating voltage an undesirable period of unreliable control operation would result. A potential transformer on the source side of the switchgear may be employed to maintain charge on the power capacitor. However such approaches as disclosed in U.S. Pat. No. 4,352,138 to Gilker requires the addition of a potential transformer and in that invention two power capacitors. The second power capacitor operates to supply power in the event that the preferred potential transformer source of capacitor power and a secondary battery source both fail. Current transformers, necessarily present to monitor current in the distribution line, charge the second power capacitor at the expense of accuracy when charging occurs. The use of multiple sources of power to achieve greater reliability is not unusual and other approaches exist.

The use of current transformers to charge a power capacitor is particularly economical when the current transformer must be present to monitor distribution line current. However there are difficulties associated with the use of the monitoring current transformers to charge a power capacitor. An additional dilemma involves the speed with which the capacitor is allowed to charge.

If the power capacitor is allowed to charge with great rapidity, sufficient current is drawn to adversely affect the accuracy of the current monitoring function of the control. A rapid charging of the second power capacitor in U.S. Pat. No. 4,352,138 to Gilker only occurs when the primary and secondary sources have failed. Additionally U.S. Pat. No. 4,352,138 to Gilker discloses a circuit to prevent closing the distribution line switches when insufficient power exists to allow the control to operate the switchgear to an open position.

Alternately the power capacitor may be placed in series with a test resistor which monitors phase currents as disclosed in U.S. Pat. No. 4,393,431 to Gilker and U.S. Pat. No. 4,131,929 to Moran. However the rate of charging the power capacitor is limited by the test resistor.

Alternately, the power capacitor may be a charged and maintained at a more moderate rate by inserting a moderate resistence in the charging path with a less serious affect on the current monitoring function. However during the period the power capacitor is being charged to an appropriate level, the control should be inactivated to prevent unreliable operation. U.S. Pat. No. 4,027,203 to Moran discloses one method of inhibiting control operation while the power capacitor is being charged to an appropriate level. Similar dilemmas exists when the preferred source of supply for the power capacitor is either a potential transformer or a battery.

When a potential transformer is the preferred source the designer must chose between providing a high or a low resistance path to the power capacitor. A low resistance path will rapidly charge the capacitor but results in vastly oversizing the transformer for an intermittent demand of the power capacitor. If the transformer is not oversized an early failure will result from overstressing the transformer to continuously supply what should be an intermitted demand. Alternately if a high resistance path is chosen the power capacitor is unable to furnish sufficient power for reliable switchgear control operation until the power capacitor has been charged for a longer period.

If a battery is chosen as the preferred source for capacitor charging the dilemma remains. A high resistance charging path results in longer periods of unreliable switchgear control operation while the power capacitor is being charged. A low resistance path will more rapidly exhaust the battery and require batteries of great size.

Current transformers typically used in switchgear controls to monitor phase currents have ratios between the primary and secondary currents on the order of 1,000 to one. If 100 amperes is flowing through the primary of such a phase transformer than one tenth of an ampere will flow through its secondary. One hundred milliamperes will in most cases be adequate to power the quiescent demands of the switchgear control.

Large capacitors on the order to 24,000 micro farads are used as power capacitors when the activating demands on the switchgear control are large. For every volt the power capacitor dips below the nominal bus voltage, the recovery time will be on the order of fifteen hundred cycles if 100 amperes of alternating current is flowing in the distribution line. If the power capacitor relied on the current transformer alone and was five volts below nominal operating level, more than a second will elapse before the control is restored. Considering that the normal current on a distribution line may fluctuate an order of magnitude in a twenty-four hour day the time to restoration may be in excess of ten seconds.

A particularly unfortunate situation can occur when the power capacitor is partially discharged in closing the distribution line switches and the control attempts to initiate a opening before the current transformers alone can recharge the power capacitors. Because the control lacks sufficient power to initiate the opening of the distribution line switches they never open. In many controls this results in the control latching in an attempt to open mode, since the current transformers lack the ability to supply the current required by the control in an active state. For this reason a primary source of power other than current transformers is customarily provided.

SUMMARY OF THE INVENTION

The present invention achieves a distribution line powered switchgear control which is accurate, economical and reliable for repeated operations under normal and abnormal distribution line conditions.

The switchgear control is used to activate a switchgear mechanism which opens and closes distribution lines switches in accordance with the dictates of the control. Typically, the switchgear control will include an activating circuit which draws considerable power to pilot the switchgear mechanism. Often the activating circuit supplies current to relays or solenoids which directly or intermediately release energy stored in the switchgear mechanism to open to close the distribution line switches. Additionally, indicating or subsidiary relays or solenoids will also be energized by the activating circuit. The activating circuit will be controlled by at least one control circuit which appropriately determines the state of the distribution line switches through the activating circuit.

The control circuit may only respond to the state of a relay contact. The contact state is in turn controlled at a power distribution center. Such limited control functions are often used in conjunction with phase fault indicators whose state is determined by the phase transformers.

Other control circuits, typically used in reclosers, respond to the level of current in the distribution line as indicated by phase transformers. The control circuit for a recloser will also determine how long under various fault conditions a distribution line switch may remain closed. Additionally, a recloser control circuit will determine how many switch openings will be allowed within a period before distribution line switch reclosing is prevented. Prevention of reclose due to a non-temporary condition causing faults is known as lock out. Generally a lock out must be cleared by maintenance persons at the control. Because recloser controls are primarily self actuating devices an enhancement feature to prevent a closing operation unless the control has the capability to subsequently open may be included with the switchgear control. Prevention of reclose due to insufficient power is known as block of reclose. This enhancement includes a voltage sensing circuit to determine the energy storage level of the control, and an interlock circuit to prevent closing unless sufficient power will exist in the control. The interlock circuit typically uses mechanical switches and electromechanical relays. In some cases solid state devices or logic circuitry may be employed as switch or relay equivalents.

This block of reclose function, by monitoring the voltage of the control bus, prevents the switchgear control from initiating the distribution line switches closing unless sufficient power will be available in the control to initiate a subsequent opening operation. This function can be achieved by using voltage sensing, position sensing and interlock circuits. When the recloser mechanism has separate closing and opening coils, as is usually the case, the position sensing circuit is unnecessary. The switchgear control of the present invention achieves block of reclose with voltage sensing and interlock circuits. The voltage sensing circuit is in parallel with the control and activating circuits. When the recloser has tripped a predetermined number of times to lock out the voltage sensing, control and activating circuits are disconnected from the power bus to reduce the load on the auxilliary power source and to prevent reclosing the distribution line switches. When bus voltage is insufficient to allow the switchgear control to initiate a subsequent opening of the distribution line switches, closing is prevented by the interlock circuit. In one embodiment of the present invention the voltage sensing circuit includes a sensing Zener diode which biases a sensing transistor on, if and only if there is sufficient voltage. The interlock circuit comprises an interlock field effect transistor (FET) which is biased on by the voltage sensing circuit in the on state and, allows current to flow in an interlock relay coil. Normally open contacts of the interlock relay are connected in series with the closing coil of the switchgear mechanism.

Power for the activating circuit and the rest of the switchgear control is most economically supplied by energy stored in a power capacitor.

To further enhance reliable swtichgear control operation, an auxilliary power source for the activating circuit and the rest of the switchgear control is provided. The auxilliary power source is isolated from the power capacitor so that neither degrades the performance of the other. Isolation between the auxilliary power source and the power capacitor is obtained by blocking devices, typically diodes. When a battery is employed as an auxilliary source a battery blocking device is connected between the power capacitor and the load it may supply. The battery blocking device is oriented to allow current to flow into and through the load from the power capacitor but prevents current from flowing into the power capacitor from the battery. Similarly a capacitor blocking device is connected between the battery and the load and oriented to allow the battery to supply the load but prevent current from the power capacitor from flowing into the auxilliary battery. Most often the auxilliary power source will be a battery with an associated charging circuit. The sorce of power stored in the power capacitor will often be provided by two sources. One source is a current transformer operatively connected to each phase of the distribution line being monitored. These current transformers act as phase transformers to provide an output which is proportional to the current in each phase of the distribution line for monitoring purposes and a portion of their output is used to provide power to the switchgear control. A second standby power source will often be a battery which has a greater storage capability than the power capacitor. Alternately, the standby power source may be the rectified output of a potential transformer connected to the source side of the distribution line. The energy stored in the power capacitor should be maintained at a sufficient level to supply activating power as much as possible. To reduce the period when the power capacitor is below that level, a fast arming circuit is employed to charge it, thus maximizing the effective operability of the switchgear control of the present invention.

The fast arming circuit provides a temporary path of low resistance to charge the power capacitor to an appropriate level rapidly. The low resistance path is established by an active current controller switched between high and low resistance states. The current controller is usually an arming transistor having an arming diode in anti-parallel shunting connection to the base-emitter junction of the arming transistor. When the voltage of the power capacitor caused by the charging of the power capacitor from the primary power source rises to the appropriate level the arming diode will be foreward biased and cause the current controller to switch to a high resistance state. The operation of the fast arming circuit is of course dependent on the number of power sources available and the preference assigned to each.

In a simple embodiment of the present invention, the sole power source of the switchgear control consists of a potential transformer and associated rectifier. The fast arming circuit conducts current from the rectifier to the power capacitor and is biased to a very low conducting state when the power capacitor has stored sufficient energy for switchgear control operation. When the power capacitor is charged and the switchgear control is in the quiescent state, minimum current is drawn from the rectifier to maintain the power capacitor and provide the quiescent load. When the switchgear control is in an active state to change the position of the distribution line switches or, the power capacitor lacks sufficient stored energy, the current controller switches to a lower resistance state to rapidly restore the switchgear control to a reliable state.

When an additional power source is used for rapidly charging the power capacitor through the fast arming circuit, quiescent current requirements of the switchgear control can be supplied from phase transformers without seriously affecting the accuracy of the current monitoring function of the switchgear control when the distribution line switches are closed. The additional source will be in a standby mode as long as the control has not been recently operated. When the standby power source is a long life battery which is not maintained by a battery charger, the use of the phase transformers to maintain the power capacitor extends the battery's operational life in the control considerably. Should potential transformers be used as a standby source they are usually connected to the source side of the line with appropriate transformer protecting means usually a fuse in the primary circuit. Unfortunately, given the state of the art, transients on the distribution line frequently present during a fault condition will too often cause the fuse to blow. Usually this has resulted in unanticipated control failure. When the present invention is employed reliable able quiescent control operation and tripping is still provided since the line currents will maintain the power capacitor.

DESCRIPTION OF PREFERRED EMBODIMENTS

Figure 1:
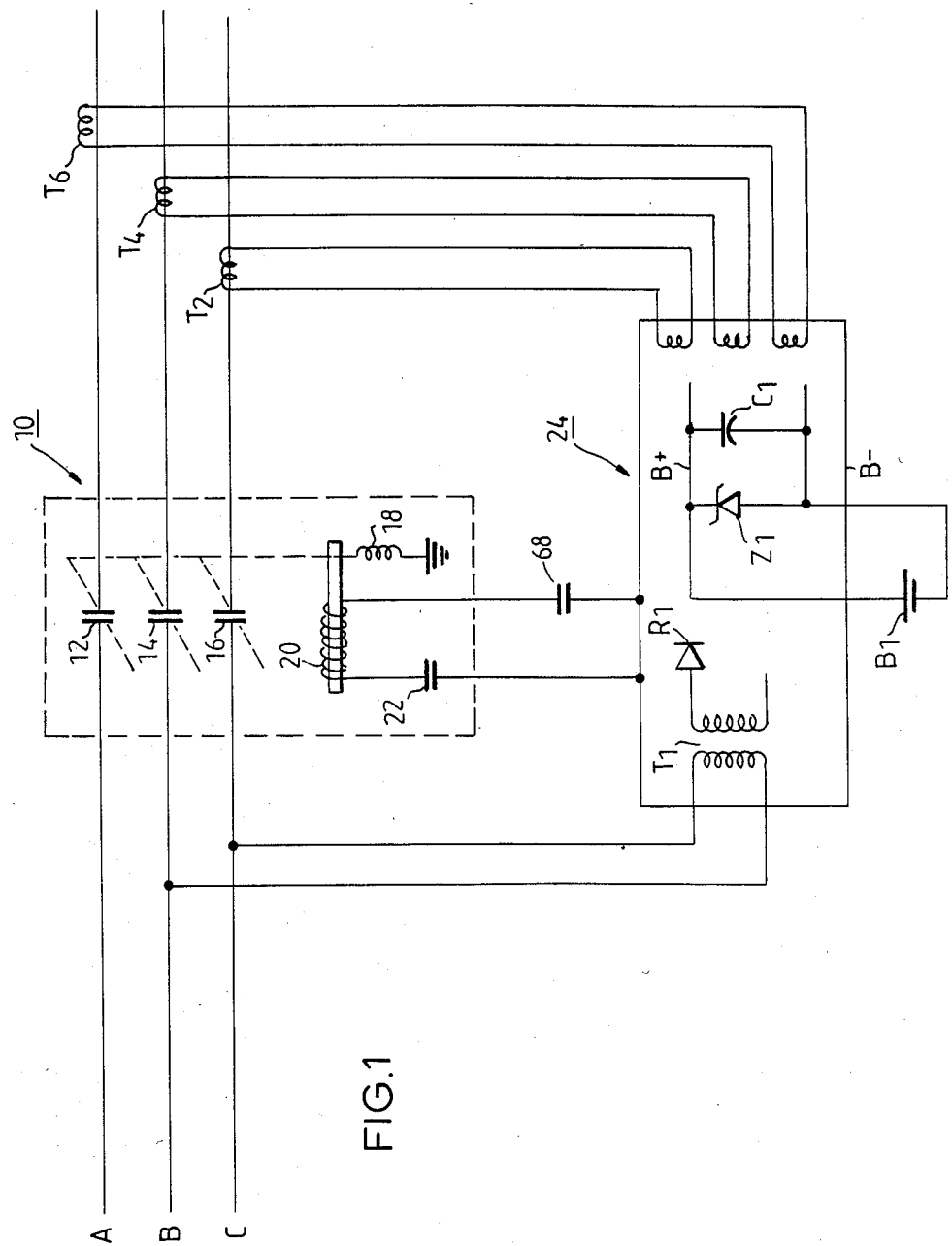
FIG. 1 illustrates a switchgear control with multiple sources of power and its associated switchgear mechanism.

Referring now to FIG. 1, a switchgear mechanism is represented in schematic form. Switchgear mechanism 10 includes three ganged distribution line switches 12, 14, and 16 to interrupt current flowing in phases A, B, and C of a distribution line. Switchgear mechanism 10 further includes a stored energy means symbolically shown as spring 18 to position the distribution lines switches 12, 14, and 16. The release of the energy stored in spring 18 is symbolically shown as being controlled by solenoid 20. Current in solenoid 20 may be interrupted by switch or relay contacts 22.

Switchgear control 24 selectively controls the flow of current in the coil of solenoid 20 to appropriately allow the opening or closing of distribution line switches 12, 14, 16. Operable power is maintained in switchgear control 24 by maintaining power capacitor C1 at an appropriate voltage level which basically is determined by the breakover voltage of Zener diode Z1. Power is supplied to switchgear control 24 from potential transformer T1 which is shown connected across two of the phases of the distribution line on the source side of the distribution line switches 12, 14, and 16. Potential transformer T1 has an associated rectifier R1 as a source of direct current to charge capacitor C1 by circuitry not shown in this figure. Switchgear control 24 also obtains power from battery B1 which is shown connected directly to the B+ and B− buses. An additional source of power for switchgear control 24 is provided by current transformers T2, T4, and T6 on the load side of distribution lines switches 12, 14 and 16. Rectifiers associated with these current transformers or phase transformers T2, T4 and T6 are not shown in this figure nor is the connection between the rectified output of the phase transformers and power capacitor C1 shown. The switchgear control 24 of the present invention may omit two of the three alternate sources of power for the switchgear control 24. However, preferred forms of switchgear control 24 will employ at least two alternate sources of power for greater reliability.

Figure 2:
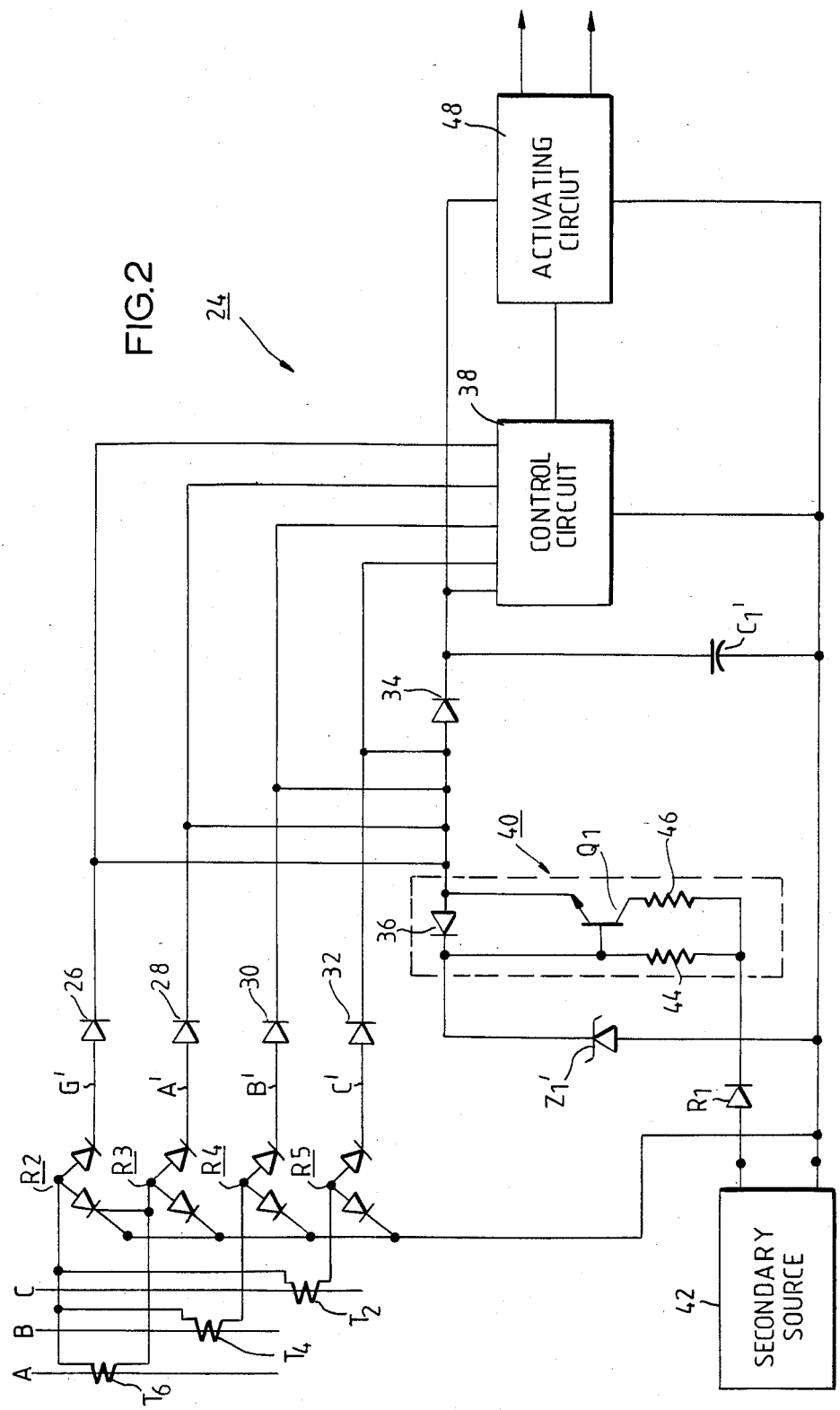
FIG. 2 illustrates a switchgear control with a fast arming circuit.

Switchgear control 24 is shown in greater detail in FIG. 2. The standby power source charging power capacitor C1' may be a potential transformer such as that shown as T1 in FIG. 1 or a station battery with or without an associated charging circuit similar to that shown as B1 in FIG. 1. Current transformers T2, T4 and T6 are used both for monitoring the individual phase currents in the distribution line and for maintaining the state of charge on power capacitor C1' when the control is in a quiescent state. The phase transformers T2, T4 and T6 are arranged in a star configuration so that they produce signals representing the current in each phase and ground of the distribution line. Phase transformer T2 output is rectified by rectifier R5 to produce a direct current analog denoted C' of the current in phase C of the distribution line. A portion of the rectified secondary current C' is fed through phase isolating diode 32 to the juncture of the anodes of the diodes 34 and 36.

Some current conducted by diode 22 is employed in fast arming circuit 40 and the remainder is employed for monitoring in control circuit 38. Secondary curents in the other phase transformers are likewise rectified in rectifiers R2–R4 and passed through isolating diodes 26–30 where they are summed with the rectified C' current at the juncture between diodes 34 and 36. If the charge on power capacitor C1' does not result in a voltage one diode drop above the breakover voltage of Zener diode Z1', the summed rectified phase currents A', B', C' and G' act to raise the voltage of power capacitor C1' to that value. Excess current passes through arming diode 36 and Zener diode Z1. When the summed rectified phase currents A', B', C', and G' are not being diverted through arming diode 36 then fast arming circuit 40 is activated to rapidly bring power capacitor C1' up to operating voltage for switchgear control 24.

Fast arming circuit 40 includes a current controller to conduct current from a secondary source 42 to charge power capacitor C1' when the phase currents are insufficient to maintain operating voltage for control 24 on power capacitor C1'. The current controller typically comprises fast arming diode 36, arming transistor Q1, and resistors 44 and 46. Current from secondary source 42 passes through rectifier R1, arming resistor 46, and the collector and emitter terminals of transistor Q1 to charge power capacitor C1'. Arming diode 36 shunts the base-emitter junction of Q1 in anti-parallel relationship. When arming diode 36 is conducting current, the base-emitter junction is reversed biased and arming transistor Q1 cannot conduct. When the voltage at the cathode of rectifier R1 exceeds the voltage on power capacitor C1' by two diode drops, then arming transistor Q1 will conduct to charge power capacitor C1' to the operating voltage of control 24. Normally, when control 24 is in a quiesent state, phase currents are conducted through arming diode 36 and bias arming transistor Q1 off. Arming resistor 46 is part of the main conduction path through the collector and emitter terminals of transistor Q1. Resistor 46 limits the amounts of current drawn from secondary source 42 but is of relatively low resistance to allow rapid charging of power capacitor C1'. Arming resistor 46 and and transistor Q1 form a low resistance path to conduct current to power capacitor C1'. Resistor 44 is of considerably higher resistance and acts to drive arming transistor Q1 into a high conducting state.

A portion of the phase currents from the phase transformers T2, T4 and T6 is used for monitoring purposes in the control circuit 38. Typically control circuit 38 will sense a fault or overcurrent condition in any phase and energize activating the circuit 48. Activating circuit 48 will in turn initiate opening of distribution line switches contained in switchgear mechanism 10 or cause overcurrent indicators to display a fault condition, or both. Phase transformers T2, T4 and T6 may be omitted when control 24 is not fault responsive or fault indication is undesired. Under those circumstances the only source of power for switchgear control 24 is that from secondary source 42. Fast arming circuit 40 continues to serve an important function in providing a rapid charging of power capacitor C1' to provide power for activating circuit 48.

Figure 3:
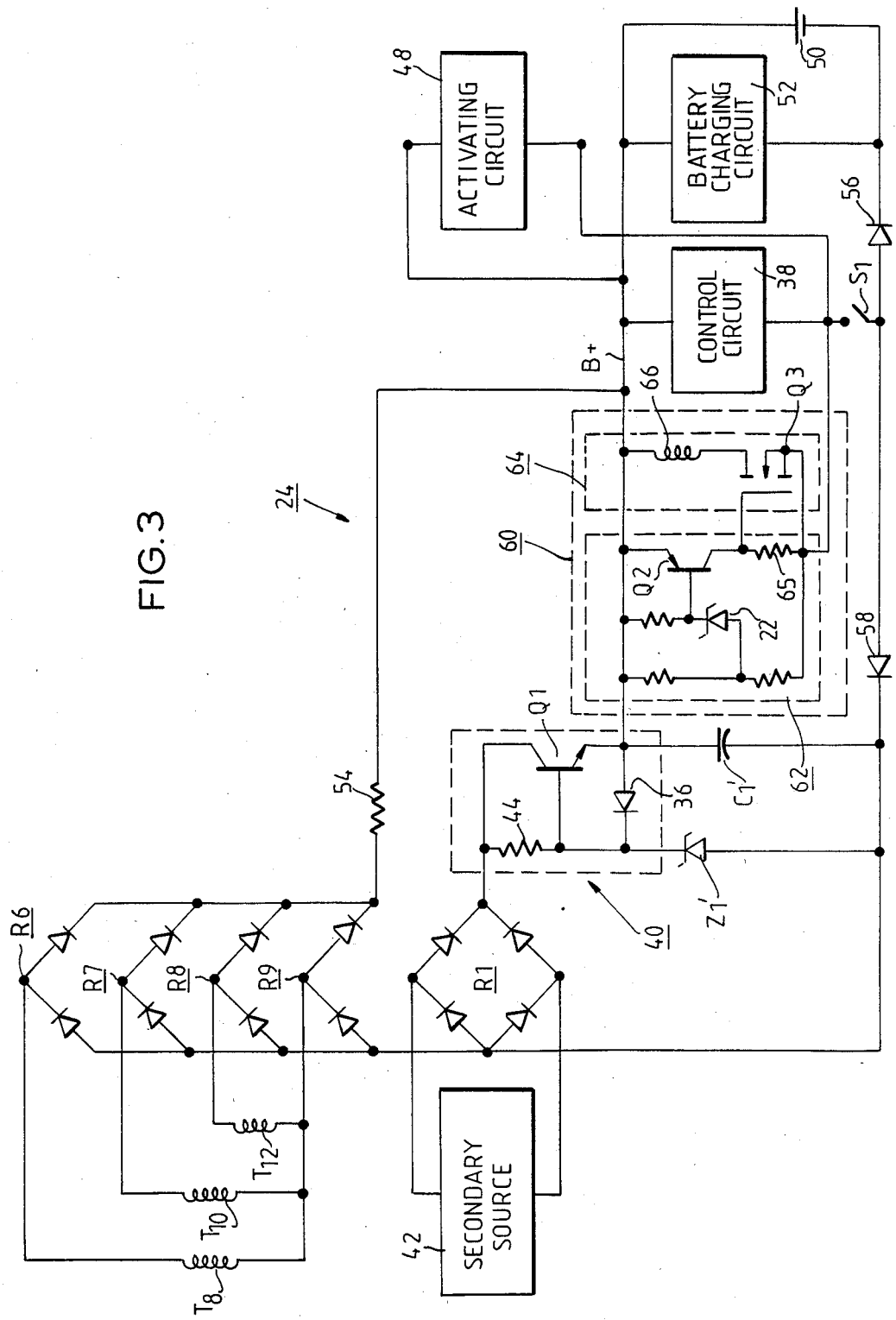
FIG. 3 illustrates a switchgear control with three alternate sources of power and a block of reclose function.

FIG. 3 provides an illustration of another embodiment of switchgear control 24 which is particularly suitable for recloser controls. There are three sources of switchgear control power shown in FIG. 3; auxilliary source 50, secondary source 42, and current transformers T8, T10, and T12. In this embodiment the current transformers are provided only to provide power to switchgear control 24 in a manner similar to that shown in FIG. 2. Rectifier R1 is more completely shown as a bridge rectifier containing four rectifying diodes. Additional phase transformers are connected to control circuit 38 to provide phase current indications. The multiple sources of power for switchgear control 24 provides a highly reliable operation of the control. Secondary source 42 is preferably a station battery in conjunction with a recharging circuit powered by either a potential or a current transformer.

Fast arming circuit 40 functions in the same manner as that described in connection with FIG. 2 to rapidly charge power capacitor C1' when it is not at switchgear control 24 operating voltage. Since a station battery is used as secondary source 42, it does not require limiting the current drawn while arming power capacitor C1'. As a consequence the arming resistor 46 shown in FIG. 2 is eliminated in FIG. 3. Resistor 44 conducts current to the base of arming transistor Q1 and the cathode of Zener diode Z1'. Its high value of resistance limits current drawn from the secondary source 42 when rapid charging of power capacitor C1' is unnecessary. Arming diode 36 prevents arming transistor Q1 from conducting when power capacitor C1' is charged to the operating level of switchgear control 24 and current from transformers T8, T10, and T12 is present.

In FIG. 3 auxilliary power source 50 is shown as a battery which is maintained in a charged state by battery charging circuit 52. Battery charging circuit 52 may obtain its power from independent potential or current transformers or from the source used by secondary source 42. Obviously, if independent sources of power are used the reliability of the switchgear control 24 is further enhanced. The output of current transformers T8, T10 and T12 are rectified in rectifiers R6, R7, R8 and R9 in a manner similar to that shown in FIG. 2. Limiting resistor 54 connects the outputs of rectifier R6-R9 to the positive bus of control 24. Neither the currents from current transformers T8, T10 and T12 nor, the power supply capacitor C1' can supply current to auxilliary source 50 or battery charging circuit 52 because of the action of power capacitor blocking diode 56. Battery blocking diode 58 similarly prevents current from auxilliary source 50 from charging power capacitor C1'. This isolation between the power capacitor C1' and auxilliary source 50 prevents a failing source from degrading the performance of an adequate source.

Switchgear control 24 as illustrated in FIG. 3 is further enhanced by adding a block of reclose function. This block of reclose function is desirable when the switchgear control 24 is a recloser control because of its largely autonomous functioning. It is most undesirable to have distribution line switches close when switchgear control 24 lacks the power to initiate their opening. The function is achieved by adding a block of reclose circuit 60. The block of reclose circuit 60 consists of voltage sensing circuit 62 and interlock circuit 64. The voltage sensing circuit 62 senses the voltage between the positive B+ and negative B− buses of control 24 to determine whether or not sufficient energy is stored in the power capacitor C1' or auxilliary source 50 to allow an initiation of switchgear mechanism 10 to open distribution switches 12, 14, and 16 after a close signal has initiated their closing. Voltage sensing circuit 62 is a relatively conventional circuit which conducts current through sensing transistor Q2 as long as sufficient voltage for a subsequent opening signal exists. The arrangement between sensing transistor Q2, associated Zener diode Z2 and the associated resistors are well within the skill of the art to select an appropriate voltage level. Only when voltage sensing circuit 62 is conducting does it enable interlock circuit 64 to allow positioning of distribution line switches 12, 14, and 16.

Interlock circuit 64 is here shown in its simplest form. The sole determination as to whether a distribution line switch may close is only determined by the bus voltage of control 24. Here interlock circuit 64 comprises a filed effect transistor Q3 which assumes a conducting state as a result of the voltage developed across resistor 65 in voltage sensing circuit 62. When interlock transistor Q3 conducts it energizes relay coil 66 to close the normally open interlock contacts 68 shown in FIG. 1. Block of reclose circuit 60 is a fail-safe circuit since distribution line switches 12, 14 and 16 may only be closed when sufficient voltage exists for a subsequent opening operation.

Block of reclose circuit 60 is in parallel with control circuit 38 and activating circuit 48. When a recloser has tripped a sufficient number of times to enter a lock out state S1 is opened to reduce the load on the power capacitor C1'. Until the recloser is returned to an operable condition these circuits are unneeded.

Many modifications of the particular embodiments of the invention described herein are possible without departing from the spirit and scope of this invention. Therefore, it is accordingly intended that the scope of this invention be not limited to the specific embodiments disclosed.

I claim:
1. A distribution line powered switchgear control comprising:
   a direct current source;
   an activating circuit for operating the switchgear mechanism to open and close the distribution line switches;
   a control circuit for controlling said activating circuit;
   a power capacitor for rapidly providing power to said activating circuit while maintaining the appropriate power levels throughout the switchgear control; and
   a fast arming circuit connected to said direct current source to rapidly charge said power capacitor through a low resistance path until said power capacitor is charged to an appropriate energy level whereupon the fast arming circuit ceases conducting.

2. A distribution line power switchgear control as set forth in claim 1 wherein:
   said fast arming circuit includes an arming transistor which has its collector and emitter in series with the direct current source; and
   an arming diode shunting the base-emitter junction of said arming transistor and oriented in opposite polarity to said junction connected to said power capacitor to bias off said arming transistor when said power capacitor is charged to an appropriate level.

3. A distribution line powered switchgear control comprising:
- a plurality of phase transformers for sensing the current in each phase of a multi-phase power distribution line and for providing power to the switchgear control when current is flowing in the distribution line and the switchgear control is in a quiescent state;
- a standby power source for providing direct current power to the switchgear control;
- a rectifier circuit interconnected with said phase transformers to provide direct current power to the switchgear control when the distribution line is conducting current;
- an activating circuit for operating controlled switchgear mechanism to open and close the associated distribution line switches;
- a control circuit for piloting said activating circuit;
- a power capacitor for providing power to said activating circuit while maintaining the appropriate power levels throughout the switchgear control; and
- a fast arming circuit to rapidly charge said power capacitor from said standby power source when the power capacitor is below an appropriate level and to minimize power drawn from the standby source when the distribution line is conducting current and the power capacitor is at an appropriate level.

4. A distribution line powered switchgear control as set forth in claim 3 wherein:
- said standby power source is a battery; and
- said fast arming circuit includes a current controller in series between said standby power source and said power capacitor which is biased off by current furnished by said phase transformers when said power capacitor is storing an appropriate level of energy.

5. A distribution line powered switchgear control as set forth in claim 4 wherein said current controller is an arming transistor which is biased off by forward biasing an arming diode which is in parallel with, and of opposite polarity to the base emitter junction of said transistor.

6. A distribution line powered switchgear control as set forth in claim 4 wherein said phase transformer currents are independently rectified in said rectifier circuit and each phase current is conducted through a phase isolator before all phase currents are summed to maintain said power capacitor when the control is in a quiescent state.

7. A distribution line powered switchgear control as set forth in claim 5 wherein said phase transformer currents are independently rectified in said rectifier circuit and each phase current is conducted through a phase isolator before all phase currents are summed to maintain said power capacitor when the control is in a quiescent state.

8. A distribution line powered switchgear control as set forth in claim 3 further comprising:
- an auxilliary power source isolated from said power capacitor for providing direct current power to said activating circuit and said control circuit.

9. A distribution line powered switchgear control as set forth in claim 8 wherein:
- said auxilliary power source is an auxilliary battery isolated from said power capacitor by a battery blocking device connected between said battery and said power capacitor;
- said power capacitor is isolated from said battery by a capacitor blocking device connected between said power capacitor and said battery; and
- further comprising an auxilliary battery charging circuit connected to the battery to maintain it in a charged state and isolated from said power capacitor by the battery blocking device.

10. A distribution line powered switchgear control as set forth in claim 9 further comprising:
- a voltage sensing circuit to determine when either the power capacitor or the auxilliary battery has sufficient power to supply said activating circuit;
- an interlock circuit which prevents said activating circuit from closing the distribution line switches when said voltage sensing circuit does not indicate that there will be sufficient power to supply said activating circuit to operate the switchgear mechanism for a subsequent opening of the distribution line switch, whereby the switchgear mechanism is inhibited from closing unless sufficient power exists for a subsequent opening.

11. A distribution line powered switchgear control as set forth in claim 10 wherein said interlock circuit blocks current flow in the closing coil of the switchgear mechanism.

* * * * *